United States Patent [19]

Hayakawa et al.

[11] Patent Number: 4,871,697
[45] Date of Patent: Oct. 3, 1989

[54] METHOD OF PRODUCING HOMOGENEOUS SILICON NITRIDE SINTERED BODIES

[75] Inventors: Issei Hayakawa; Noriyuki Ukai, both of Nagoya, Japan

[73] Assignee: NGK Insulators, LTD., Nagoya, Japan

[21] Appl. No.: 141,496

[22] Filed: Jan. 7, 1988

[30] Foreign Application Priority Data

Jan. 23, 1987 [JP] Japan ................................. 62-13815

[51] Int. Cl.$^4$ ............................................. C04B 35/58
[52] U.S. Cl. ......................................... 501/97; 501/98
[58] Field of Search ..................................... 501/97, 98

[56] References Cited

U.S. PATENT DOCUMENTS 4,119,690 10/1978 Prochazka et al. ................... 501/97
4,717,693 1/1988 Wittmer ................................ 501/97

FOREIGN PATENT DOCUMENTS 33-004075 5/1958 Japan .
49-040123 10/1974 Japan .
60-210575 10/1985 Japan ..................................... 501/97
61-003304 1/1986 Japan .

Primary Examiner—William R. Dixon, Jr.
Assistant Examiner—Anthony J. Green
Attorney, Agent, or Firm—Arnold, White & Durkee

[57] ABSTRACT

A homogeneous silicon nitride sintered body produced by placing a shaped body of silicon nitride powder into a high density silicon carbide sagger having particular properties and then firing under particular conditions.

4 Claims, No Drawings

METHOD OF PRODUCING HOMOGENEOUS SILICON NITRIDE SINTERED BODIES

BACKGROUND OF THE INVENTION

1. Field of the Invention

This invention relates to a method of producing a homogeneous silicon nitride sintered body. The method causes no change in the quality, color, or the like, of the silicon nitride sintered body and the body has high bending strength and the like.

2. Related Art Statement

Silicon nitride ($Si_3N_4$) sintered bodies are excellent in thermal resistance, thermal shock resistance, corrosion resistance and high temperature strength, and are used as high temperature structural materials, wear resistant materials or the like, for gas turbine engines, diesel engines and so on. However, in silicon nitride sintered bodies there is apt to be a great difference in sintering properties between the interior and surface of the sintered body due to decomposition of silicon nitride and evaporation of sintering aid produced in the firing. Therefore, in order to suppress the unhomogenization of the sintering properties, the firing is carried out in a sagger.

As the sagger for firing silicon nitride sintered bodies, there have hitherto been known a carbon sagger, a carbon sagger covered with a chemically deposited silicon carbide (Japanese Patent laid open No. 60-210,575), a carbon sagger covered at its inner face with silicon carbide formed by a reaction with carbon in the sagger (Japanese Patent Application Publication No. 61-3,304), a sagger composed of an inner silicon nitride sagger and an outer refactory sagger (Japanese Patent Application Publication No. 49-40,123), and a sagger mainly composed of graphite and silicon carbide (Japanese Patent Application Publication No. 33-4,075).

In the carbon sagger, however, the evaporation is large on the fired surface of silicon nitride sintered body. Further, SiC is liable to be produced on the surface, so that the strength at the fired surface becomes undesirably small.

In the carbon sagger covered with chemically deposited silicon carbide, peeling often occurs between the carbon layer and silicon carbide layer, and thus the durability of the sagger is small.

In the sagger covered at its inner face with silicon carbide formed by a reaction with carbon in the sagger, the silicon carbide surface layer is porous, so that the effect of covering the carbon with a silicon carbide layer is substantially small. Further, the evaporation on the fired surface of silicon nitride is large, as in the case of the carbon sagger, and thus the strength at the fired surface is low. Moreover, the change of quality and color such as stripes, spots and the like are apt to be produced in the surface layer of the sintered body.

In the sagger composed of an inner silicon nitride sagger and outer refractory sagger, softening is liable to be caused in the firing, so that the firing of shaped bodies can not be carried out in a large weight or large amount. Furthermore, the surface is apt to be decomposed to degrade the durability. Moreover, the quality and color changes such as stripe, spots and the like are apt to form in the surface layer of the sintered body.

In the sagger mainly composed of graphite and silicon carbide, the whole of the sagger is low in density and highly porous, so that the evaporation on the fired surface silicon nitride is large and the strength at the as-fired surface is small. Further, the quality and color changes such as stripe, spot and the like are apt to be caused in the surface layer of the sintered body.

In these conventional saggers, there are problems on the tightness, durability and the like. When using these saggers, the resulting silicon nitride sintered bodies do not yet have sufficient properties, because the quality and color changes are caused in the surface layer.

SUMMARY OF THE INVENTION

It is an object of the present invention to solve the aforementioned problems of the conventional techniques and provide a method of producing homogeneous silicon nitride sintered bodies wherein the method causes no quality and color change in the surface layers of the silicon nitride sintered bodies such that the bodies have sufficient properties such as strength and the like.

According to the invention, there is the provision of a method of producing a homogeneous silicon nitride sintered body, which comprises placing a shaped body composed of silicon nitride powder and sintering aid into a high density silicon carbide sagger having a bulk specific gravity of not less than 3.0 and an apparent porosity of not more than 1.0% and then firing it at a temperature of 1,500°~1,800° C. under an approximately atmospheric pressure.

DESCRIPTION OF THE PREFERRED EMBODIMENTS

The high density silicon carbide sagger used in the invention is required to have a bulk specific gravity of not less than 3.0. If the bulk specific gravity is less than 3.0, the durability is poor and thus large amounts of shaped bodies can not be fired.

Furthermore, the sagger is required to have an apparent porosity of not more than 1.0%. If the apparent porosity is more than 1.0%, body evaporation on the fired surface of silicon nitride body becomes large to decrease the strength and also, quality and color changes are apt to occur in the surface layer of the resulting sintered body.

The firing is usually carried out under an approximately atmospheric pressure, particularly a gauge pressure of 0~0.5 $kg/cm^2$.

The firing temperature is required to be within a range of 1,500°~1,800° C. When the firing temperature is lower than 1,500° C., the silicon nitride is not densified, while when it is higher than 1,800° C., decomposition and evaporation often occur, thus providing insufficient properties.

Moreover, the firing according to the invention may be carried out under a gauge pressure of up to 10 $kg/cm^2$, and in this case, the firing temperature may preferably be 1,500°~2,000° C.

According to the invention, the high density silicon carbide sagger preferably has a thickness of 5~30 mm. When the thickness is less than 5 mm, deformation of the sagger is apt to occur under the application of a load. When it exceeds 30 mm, the thermal conductivity is poor and a large volume is not achieved, and further, the weight becomes heavy and the workability poor.

The shaped body used in the invention is composed of silicon nitride powder and sintering aid. Of course, the shaped body may contain shaping assistants such as lubricants, binders and the like. Further, a shaped body degreased after the shaping may be used.

The following examples are given in illustration of the invention and are not intended as limitations thereof.

EXAMPLE 1, COMPARATIVE EXAMPLE 1

60 parts by weight of water was added to 100 parts by weight of a mixed powder of α-type silicon nitride powder having an average particle size of 0.7 μm, 3% by weight (% by weight is simply shown by % hereinafter) of cerium oxide, 5% of magnesium oxide and 2% of strontium oxide. The resultant batch was mixed and pulverized in a pulverizer for 7 hours.

1 part by weight of polyvinyl alcohol was then added to the resulting pulverized mass and this mixture was dried by spraying. The dried mass was shaped into a circular plate of 35 mm (Φ)×20 mm or a square plate of 60 mm×60 mm×10 mm by means of a mold, and the shaped mass was then subjected to a cold hydrostatic pressing step under a pressure of 2,500 kg/cm$^2$.

A high density silicon carbide sagger was used as a sagger for the firing. The sagger consisted of a cylinder with an outer diameter of 100 mm, an inner diameter of 80 mm and a height of 80 mm, a bottom plate, and a cover with an outer diameter of 100 mm. The sagger had a thickness of 10 mm, had a bulk specific gravity of 3.05 and an apparent porosity of 0.3% (Example 1). A comparative sagger was obtained by placing silicon nitride into a sagger composed of a carbon cover and cylinder, and reacting a silicon vapor produced at a high temperature with the carbon in the interior of the sagger to form silicon carbide on the inside surface of the carbon sagger, according to the conventionally known method (Comparative Example 1). The silicon carbide in the sagger surface of Comparative Example 1 had a bulk specific gravity of 2.8 and an apparent porosity of 10%.

In each of these saggers were place the above mentioned silicon nitride circular plate and square plate, which were then fired at 1,750° C. in a nitrogen gas atmosphere under an atmospheric pressure for 1.5 hours.

From the resulting sintered body of 60 mm×60 mm×10 mm were cut out samples of 3 mm×4 mm×40 mm, one of which had an as-fired surface at its one side and the other of which had machined surfaces at both sides. Then, the four-point bending strength and bulk specific gravity were measured with respect to these samples using the as-fired or machined surfaces as a tensile surface, while appearances at cut surface and as fired surface of a circular sample of 35 mm (diameter)×20 mm were observed. The measured results are shown in the following Table 1.

strength and bulk specific gravity of the sample containing the as-fired surface are approximately equal to those of the sample consisting of the machined surface, while when the firing is carried out by the conventional method, the bending strength and bulk specific gravity of the sample containing the as-fired surface become considerably small. That is, according to the method of the invention, the evaporation of silicon nitride surface layer is less and the sintered body having high strength and bulk specific gravity is obtained.

As a result of the observation on the cut surface of the circular sintered body, the occurrence of spots and stripe patterns is observed in the sintered body fired by the conventional method, while the silicon nitride sintered body according to the invention has no occurrence of these spots and stripes and further is homogeneous.

Furthermore, the conventional sagger produces cracks if used more than about 20 times due to heat strain generated as temperatures rise and fall, while the sagger according to the invention produces no surface change even if used 120 times. Accordingly, it is recognized that the durability of the sagger between the invention and the conventional technique is greatly different.

EXAMPLE 2, COMPARATIVE EXAMPLE 2

65 parts by weight of water was added to 100 parts by weight of a mixed powder of silicon nitride powder having an average particle size of 0.5 μm, 7% of yttrium oxide, 2% of zirconium oxide and 3% of magnesium oxide. The resultant batch was mixed and pulverized for 5 hours, dried at 120° C. in a hot air drier and again pulverized to obtain powder. Then, the powder was shaped into a circular plate of 35 mm (diameter)×20 mm and a square plate of 60 mm×60 mm×10 mm, and the shaped masses were subjected to a cold hydrostatic pressing under a pressure of 5,000 kg/cm$^2$.

A high density silicon carbide sagger was sagger was used as the sagger for the firing. The sagger was composed of a cylinder with an outer diameter of 115 mm, an inner diameter of 80 mm and a height of 80 mm, a bottom plate and a cover with an outer diameter of 115 mm. The sagger had a thickness of 18 mm, a bulk specific gravity of 3.0 and an apparent porosity of 1.0% (Example 2). A comparative sagger was made from the same silicon carbide having the same shape, a bulk specific gravity of 2.9 and an apparent porosity of 6.0 % (Comparative Example 2).

In each of these saggers was placed the aforementioned silicon nitride circular plate and square plate and then fired at 1,720° C. in a nitrogen gas atmosphere

TABLE 1

| | Kind of sagger | Bending strength (kg/mm$^2$) | | Bulk specific gravity | | Appearance Spot, stripe pattern |
|---|---|---|---|---|---|---|
| | | as-fired surface | machined surface | as-fired surface | machined surface | |
| Example 1 | High density silicon carbide sagger | 95 | 97 | 3.25 | 3.26 | absence |
| Comparative Example 1 | Carbon sagger covered with chemically deposited silicon carbide | 60 | 85 | 3.15 | 3.18 | presence |

As seen from Table 1, when the firing is carried out by the method according to the invention, the bending under a gauge pressure of 0.5 kg/cm$^2$ for 1 hour.

The samples of 3 mm×4 mm×40 mm each having the as-fired surface or machined surface were cut out from the sintered body of 60 mm×60 mm×10 mm in the same manner as described in Example 1 and then the four-point bending strength and bulk specific gravity were measured and the cut surface of the circular plate was observed to obtain results as shown in the following Table 2.

TABLE 2

| | Properties of silicon carbide sagger | | Bending strength (kg/mm$^2$) | | Bulk specific gravity | | Appearance |
|---|---|---|---|---|---|---|---|
| | bulk specific gravity | apparent porosity (%) | as-fired surface | machined surface | as-fired surface | machined surface | Spot, stripe pattern |
| Example 2 | 3.0 | 1.0 | 91 | 95 | 3.22 | 3.25 | absence |
| Comparative Example 2 | 2.9 | 6.0 | 80 | 92 | 3.17 | 3.23 | presence |

As seen from Table 2, the bending strength and bulk specific gravity of the sample containing the as-fired surface is substantially equal to that of the sample consisting of the machined surface in case of the firing according to the invention, while the strength and bulk specific gravity in Comparative Example 2 was considerably lower.

As a result of the observation on the cut surface of the circular sintered body, the occurrence of spots and striped patterns is recognized in the sintered body fired by the conventional method, while the silicon nitride sintered body according to the invention has no spots or stipes and, further, is homogeneous.

As mentioned above, in the method of producing the homogeneous silicon nitride sintered body according to the present invention, the silicon nitride shaped body is placed in a high density silicon carbide sagger and fired under particular conditions, whereby homogeneous silicon nitride sintered bodies having excellent properties can easily be obtained. Furthermore, the method according to the invention is very useful as a method of sintering articles of complicated shape such as a vane, turbocharger rotor and the like. The presently claimed method is particularly useful in producing a high strength as-fired article which does not require substantial post-sintering machining.

What is claimed is:

1. A method of producing a homogeneous silicon nitride sintered body, comprising:
    placing a shaped body consisting essentially of silicon nitride powder and sintering aid into a high density silicon carbide sagger having a bulk specific gravity of at least about 3.0 and an apparent porosity of not greater than about 1.0%; and
    firing the shaped body in a temperature range of about 1,500°–1,800° C. and at about atmospheric pressure.

2. A method according to claim 1, wherein the sagger has a thickness of about 5–30 mm.

3. A method according to claim 1, wherein the shaped body is fired at a gauge pressure of about not greater than about 0.5 Kg/cm$^2$.

4. A method of producing a homogeneous silicon nitride sintered body, comprising:
    placing a shaped body consiting essentially of silicon nitride powder and sintering aid into a high density silicon carbide sagger having a bulk specific gravity of at least about 3.0 and an apparent porosity of not greater than about 1.0%; and
    firing the shaped body in a temperature range of about 1,500°–2,000° C. and at a gauge pressure of not greater than about 10 Kg/cm$^2$.

* * * * *